E. E. CLARK.
DRY PIPE VALVE.
APPLICATION FILED APR. 24, 1917.

1,348,981.

Patented Aug. 10, 1920.
2 SHEETS—SHEET 2.

Inventor.
Ezra E. Clark
by Heard Smith & Tennant.
Attys.

UNITED STATES PATENT OFFICE.

EZRA E. CLARK, OF NEWTON, MASSACHUSETTS.

DRY-PIPE VALVE.

1,348,981.  Specification of Letters Patent.  Patented Aug. 10, 1920.

Application filed April 24, 1917. Serial No. 164,268.

*To all whom it may concern:*

Be it known that I, EZRA E. CLARK, a citizen of the United States, residing at Newton, county of Middlesex, State of Massachusetts, have invented an Improvement in Dry-Pipe Valves, of which the following description, in connection with the accompanying drawing, is a specification, like characters on the drawing representing like parts.

This invention relates to dry pipe valves such as are used in connection with sprinkler systems, and the objects of the invention are to provide an improved dry pipe valve which is simple in construction and comprises few parts; which when open presents a clear, unobstructed water-way; which is so constructed that the valve which is subjected to the air pressure will have water on both sides thereof, thus preventing it from deteriorating by contact with air; which is so constructed that if, due to a reduction of the air pressure in the system, the valve which is subjected to such air pressure has a surging motion sufficient to allow the inlet valve to become slightly unseated, said inlet valve will be released to permit water to flow; and which has other advantageous features, all as will be more fully hereinafter set forth.

In order to give an understanding of my invention, I have illustrated in the drawings a selected embodiment thereof which will now be described, after which the novel features will be pointed out in the appended claims.

Figure 1 of the drawings is a vertical sectional view through a dry pipe valve embodying my invention;

Figure 1:
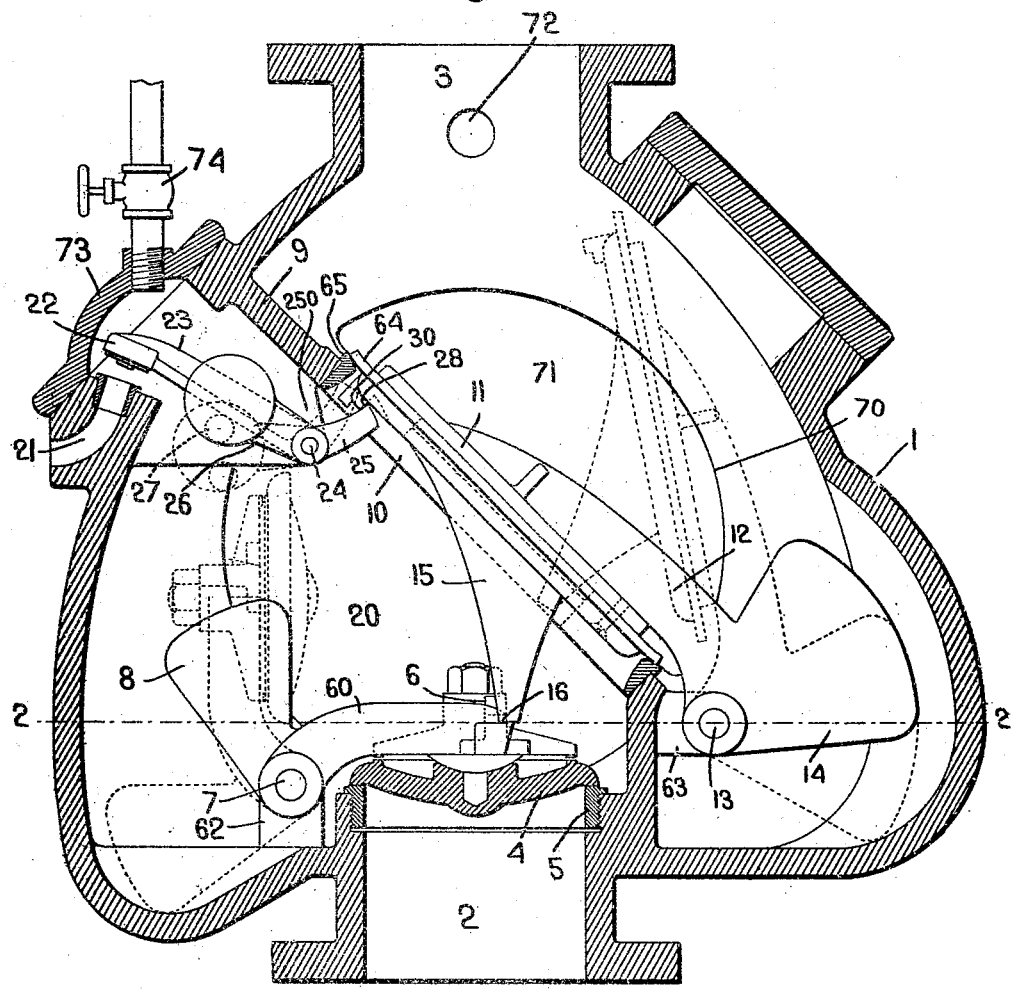
Figure 2:
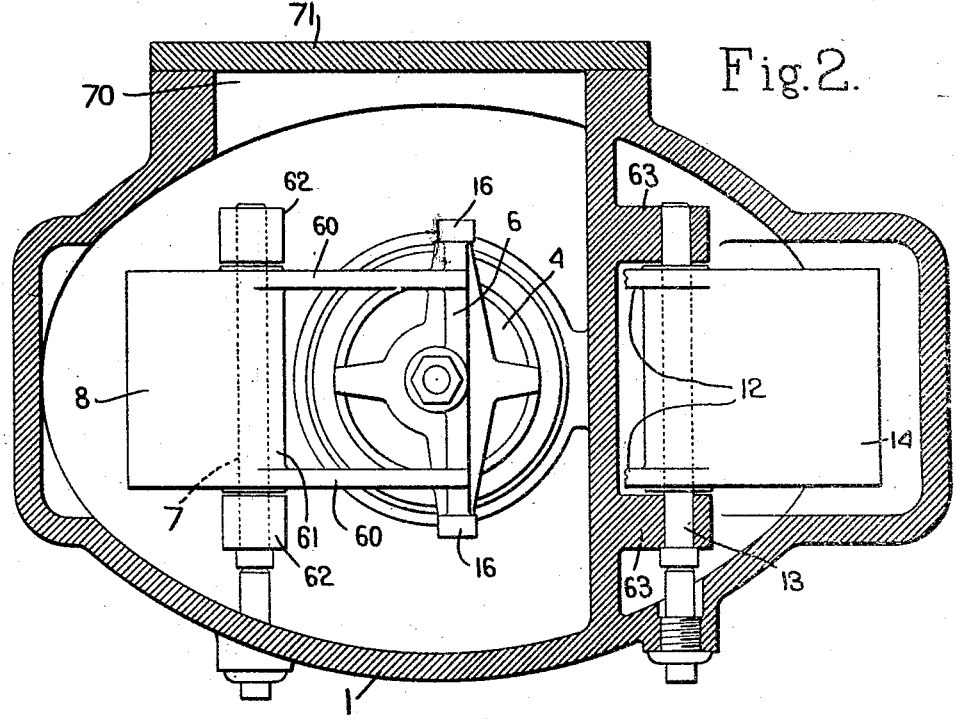
Fig. 2 is a section on the line 2—2, Fig. 1.
Figure 3:
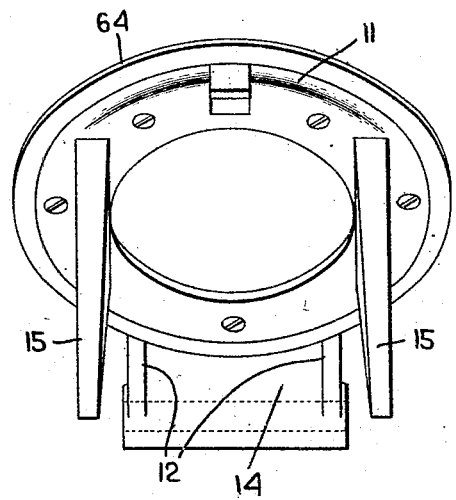
Fig. 3 is an end view of the air pressure valve.

My improved dry pipe valve comprises a valve casing 1 having a water inlet 2 which communicates with the water supply and having an outlet 3 which communicates with the sprinkler system. The water inlet 2 is controlled by an inlet valve 4 which may have any suitable construction. This valve is herein shown as comprising a valve member which is adapted to seat on the valve seat 5 and which is swiveled to a cross head 6 carried by arms 60 extending from a hub 61 which is loosely mounted on a shaft 7 that is supported in bearings 62 carried by the valve casing. The bearings 62 for the shaft 7 are situated at one side of the inlet 2. The hub 61 is preferably provided with a counterweight 8 which operates to hold the valve in open position after it has been released.

Under normal conditions the water inlet valve 4 is held closed by or through the air pressure in the system as usual in dry pipe valves, and my invention comprehends a simple device for this purpose. The valve casing 1 is divided by a partition 9 extending thereacross, which partition is formed with a port 10 constituting part of the water-way between the inlet port 2 and the outlet port 3. This port 10 is normally closed by a valve 11 which will hereinafter be referred to as the air pressure valve. This air pressure valve is somewhat larger in size than the inlet valve and it is carried by an arm 12 which is pivotally mounted on a shaft 13 sustained in bearings 63. The pivotal shaft 13 is situated on the opposite side of the water-way from the shaft 7. The air pressure valve is situated on the system side of the port 10, and when it is closed it is held to its seat by the air pressure in the system. This valve is shown as provided with a counterweight 14 which assists in holding it in open position when the valve is released.

The air pressure valve 11 is of usual construction in that it is provided with a flexible element 64 which extends peripherally thereof and which constitutes the portion of the valve that engages the valve seat 65. This member 64 is made of rubber or some other flexible material so that when the valve is closed a slight movement thereof may be permitted without separating the flap or member 64 from the valve seat.

The air pressure valve 11 has rigid therewith one or more arms 15 which are so constructed that when both valves are closed, as shown in Fig. 1, the lower ends of the arms will engage seats 16 formed on the cross-head 6, and by this means the inlet valve 4 will be held in closed position so long as the air pressure valve is closed. The air pressure valve 11 occupies an inclined position and the arms 15 extend from the valve in a position inclined relative thereto, so that when both valves are closed as shown in Fig. 1, the arms 15 extend at right angles to the plane of the water inlet valve 4 and thus act most effectively in holding the valve closed. The relation between the sizes of the valves and the relation between the positions of the shafts 13 and 7 for the pressure and inlet valves and the seats 16 against which the arms 15 rest are such that a relatively light pressure of the air against the air pressure valve is sufficient to hold the inlet valve 4 closed against a relatively heavy water pressure.

If, however, the air pressure in the system becomes reduced below a predetermined point, then it will be insufficient to hold the air pressure valve closed against the pressure of the inlet valve, and the valves will trip, thus allowing water to flow to the system.

I will preferably employ two arms 15, one on each side of the pressure valve, and these arms will preferably be spaced apart by a distance at least equal to the diameter of the inlet port 2. With this construction the seats 16 are formed at the extreme end of the cross-head 6 and the arms 15 are outside the path of movement of the valve 4. Hence, when the pressure valve 11 trips, the arms 15 are outside the path of movement of the inlet valve and the latter may open quickly without danger that it will engage said arms 15. Furthermore, since these arms 15 are thus widely separated, they do not interfere with the free flow of water when the valve is open.

In practice it is customary to introduce a sufficient amount of water on the pressure side of the air pressure valve 11 to cover the latter so that the pressure of the air against said valve will be transmitted through the body of water. The purpose of the water is to more effectually seal the valve.

It is also customary in dry pipe valves to provide a drip outlet for the neutral space or chamber 20 between the inlet valve 4 and the port 10. The purpose of this drip outlet is to allow any water which may leak into the space or chamber 20 to be drained therefrom. I have herein placed the drip outlet at the top of the chamber 20 so that any water which leaks into the chamber 20 will not be drained therefrom until after the chamber is filled with water. The drip outlet is open to the atmosphere so that the pressure in the chamber 20 will always be atmospheric pressure, even though it is filled with water, and thus the presence of the water in the chamber 20 does not affect the pressure against the valves 4 and 11. The advantage of this construction is that the pressure valve will have water both sides thereof and the flexible member 64 will, therefore, at all times be sealed from contact with the air and thus will be protected from air deterioration.

In my improved valve the drip outlet is shown at 21 and it is formed at the upper end of the chamber 20. This drip outlet is normally open when the valves are closed and means are provided for closing it when the air pressure valve opens and allows the inlet valve 4 to trip, thus preventing the escape of any water therethrough. This is herein accomplished by means of a valve 22 which is carried by an arm 23 that is pivotally mounted on a rod or shaft 24 carried in suitable bearings 250. The valve 22 is held open by the valve 11 when the latter is closed. I have provided for this by means of a latch 25 which is pivoted on the rod 24 and is provided with a counterweighted arm 26 which extends alongside of the arm 23 and is provided with a pin or projection 27 that engages the underside of said arm 23. When the air pressure valve 11 is closed, the latch 25 engages a shoulder 28 and is held by the shoulder in its full line position Fig. 1. When the pressure of the system is reduced sufficiently to permit the pressure valve 11 to open, then the latch 25 is released, thus allowing the valve 22 to close the drip outlet 21.

In the operation of dry pipe systems, it sometimes happens that the air pressure of the system becomes reduced to a point near the valve-tripping point, without, however, being sufficiently reduced to permit the pressure valve 11 to open. Under these conditions the pressure valve is apt to have a slight surging motion due to variations in water pressure against the inlet valve 4, which, however, is insufficient to separate the flap 64 from the valve seat. I have provided herein a novel device which will operate to cause the valves to trip whenever the air pressure valve has such a surging movement. The air pressure valve 11 is provided with the notch or recess 30 just below the end of the shoulder 28, said notch being so situated that when the valve 11 lifts slightly, the nose of the latch 25 will drop into the notch 30, thus locking the valve from backward movement. The notch 30 is so constructed that the latch 25 may drop thereinto before the flap 64 is separated from the valve seat. Any surging motion of the air pressure valve sufficient to permit the latch 25 to drop into the notch 30 will allow the inlet valve 4 to open slightly, thus permitting water to flow into the chamber 20. The movement of the latch into the notch 30 is sufficient to permit the drip valve 22 to close and hence the chamber 20 will become filled with water having the same pressure as the water pressure in the system. As soon as the pressure valve 11 is thus subjected to the increased water pressure on its underside, it will open, thus allowing water to flow into the sprinkler system. It will be seen, therefore, that I have provided a novel means for normally maintaining a body of water on each side of the pressure valve while providing for a release of the valves in case the air pressure on the pressure valve becomes reduced to near the tripping point and said pressure valve is subjected to any surging movement.

I have herein illustrated the casing 1 as provided with an opening 70 in one side thereof, which opening is normally closed by a cover 71. The opening is of such a size and so situated that the valves can be readily inserted or removed therethrough. The casing is also provided with an opening 72 to which is connected a suitable pipe through which water may be introduced for sealing the air pressure valve after the latter is set. 73 indicates a cover closing an opening leading to the neutral space 20, and this cover is provided with a valved connection 74 through which water may be introduced into the neutral space for sealing the valve.

While I have illustrated herein a selected embodiment of my invention, I do not wish to be limited to the constructional features shown.

I claim:

1. In a dry pipe valve, the combination with a casing having a water inlet, an outlet communicating with the system, and a water-way forming communication between said inlet and outlet, of an inlet valve device pivoted to the casing at one side of the water-way and controlling the water inlet, an air pressure valve pivoted to the casing at the other side of the water-way and normally closing the same, said latter valve being situated in a position inclined to the water-way and being held to its seat by the air pressure in the system, and two arms rigid with said air pressure valve and adapted when said valve is closed to engage the inlet valve device and hold it closed, said arms being situated and moving in planes either side of the inlet whereby when the valves are open said arms do not interfere with the flow of water through the waterway.

2. The combination with a valve casing having a water inlet and an outlet connected by a ported water-way, of an air pressure valve for closing the port of the water-way and normally held to its seat by the air pressure in the system, an inlet valve for the water inlet, connections between said valves whereby the air pressure valve when seated will hold the inlet valve to its seat, said casing having a neutral space between the inlet valve and the air pressure valve, and a drip outlet leading from said neutral space at the upper end thereof whereby when the valves are closed the neutral space may be maintained full of water, a drip valve for the drip outlet, which drip valve is separate from said connection, and means for holding the drip valve open by the closed air pressure valve.

3. In a dry pipe valve, the combination with a casing having a water inlet and an outlet connected by a ported waterway, an inlet valve, an air pressure valve for closing the port in the water-way and subject to the pressure in the system, said casing having a neutral space between the inlet valve and the air pressure valve, a pivotally-mounted latch automatically operative to prevent return movement of the air pressure valve when the latter becomes partially unseated, and a drip valve for said neutral space normally held open by said latch but which is permitted to close when the latch moves into operative position.

In testimony whereof, I have signed my name to this specification.

EZRA E. CLARK.